Figure 1:
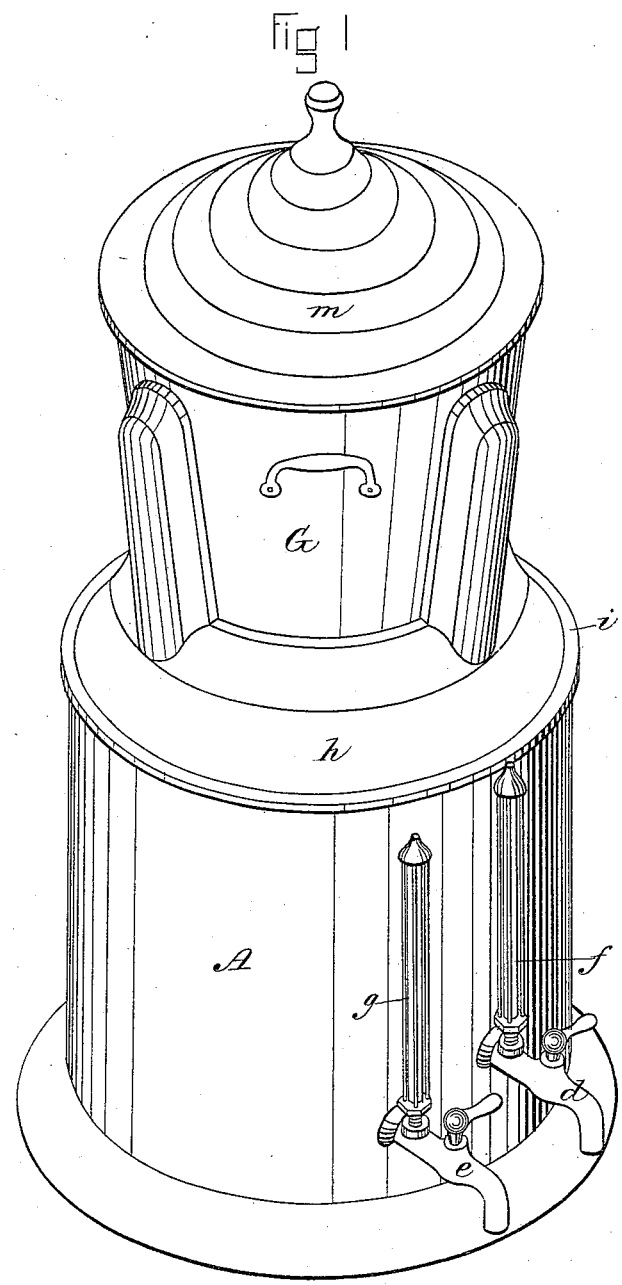

(No Model.) 2 Sheets—Sheet 1.

J. S. SANBORN.
COFFEE STEAMER OR URN.

No. 342,879. Patented June 1, 1886.

WITNESSES
W. J. Cambridge
J. S. F. Huddleston

INVENTOR
James S. Sanborn
By Teschemacher
Atty (No Model.) 2 Sheets—Sheet 2.
J. S. SANBORN.
COFFEE STEAMER OR URN.
No. 342,879. Patented June 1, 1886.
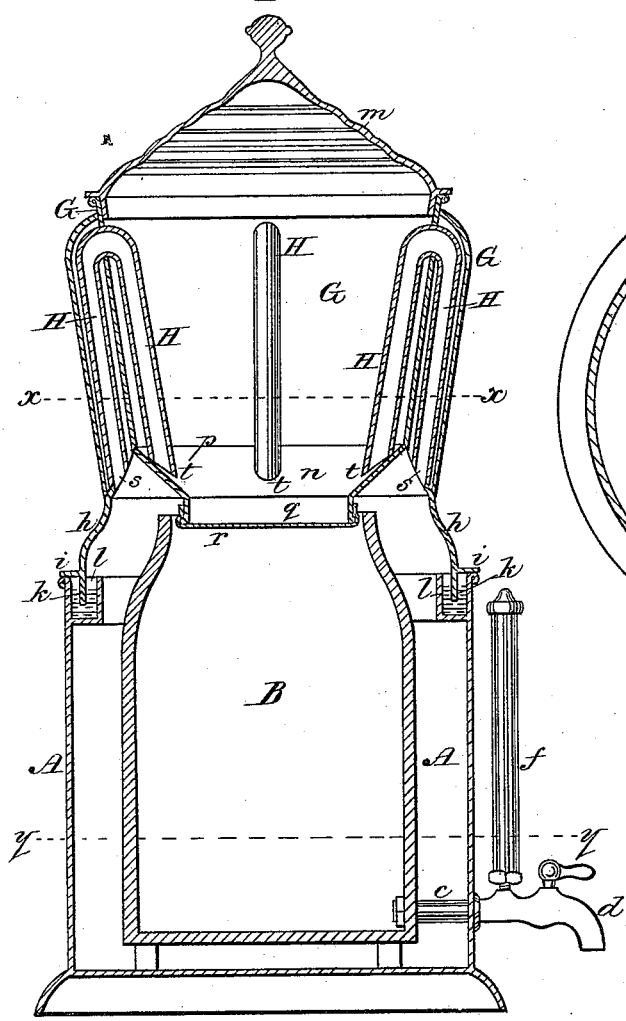
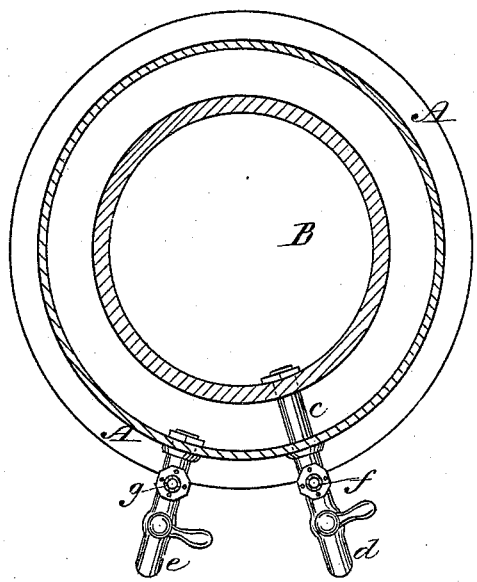
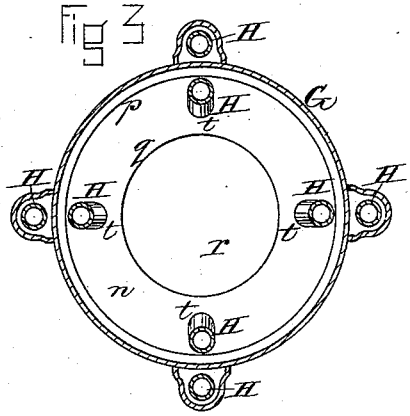
WITNESSES
W. J. Cambridge
J. S. F. Huddleston
INVENTOR
James S. Sanborn
By F. E. Teschemacher
Atty
N. PETERS, Photo-Lithographer, Washington, D.C.

UNITED STATES PATENT OFFICE.

JAMES S. SANBORN, OF BOSTON, MASSACHUSETTS.

COFFEE STEAMER OR URN.

SPECIFICATION forming part of Letters Patent No. 342,879, dated June 1, 1886.

Application filed January 13, 1886. Serial No. 188,470. (No model.)

*To all whom it may concern:*

Be it known that I, JAMES S. SANBORN, a citizen of the United States, residing at Boston, in the county of Suffolk and State of Massachusetts, have invented certain Improvements in Coffee Steamers or Urns, of which the following is a full, clear, and exact description, reference being had to the accompanying drawings, making part of this specification, in which—

Figure 1 is a perspective view of a coffee steamer or urn constructed in accordance with my invention. Fig. 2 is a vertical section through the center of the same. Fig. 3 is a horizontal section on the line $x\ x$ of Fig. 2. Fig. 4 is a horizontal section on the line $y\ y$ of Fig. 2.

To make the best coffee it is essential that the water used to make the infusion should be kept at or near the boiling-point while it is percolating through the ground coffee in the coffee-steeping vessel in order that the essential oils and acid properties which constitute the aroma may be thoroughly extracted and pass with the infusion into the coffee-receptacle beneath. Attempts have been made to accomplish this result in coffee urns or steamers adapted for use in hotels, restaurants, &c., in some cases by surrounding the coffee-steeping vessel with a steam-jacket communicating with the hot-water boiler beneath, and in other cases by conducting steam from said boiler by means of pipes or passages to the top of the coffee-steeping vessel, whereby the steam is discharged into the same above the level of the liquid therein; but in all such apparatus the water in the steeping-vessel, even if quite hot when poured in, is not maintained at a sufficiently high temperature, and consequently in passing through the ground coffee it only partially extracts the essential oils and other valuable properties of the same, leaving a large portion behind to go to waste, thereby making a much poorer quality of coffee than would be the case if all the valuable properties could be extracted.

My invention has for its object to overcome this difficulty and to provide a coffee steamer or urn in which the water will be kept boiling hot during the entire time that it is percolating through the ground coffee in the steeping-vessel; and to this end my invention consists in the combination, with the boiler and its inclosed coffee-receptacle, of a coffee-steeping vessel placed over the same and provided with a series of steam-pipes communicating with the said boiler and extending up to or nearly to the top of the steeping-vessel and down within the same to or nearly to the bottom thereof, whereby the steam is always discharged below the level of the extracting liquid in said steeping-vessel in such a manner as to constantly maintain it at or near the boiling-point during the entire time that it is percolating through the ground coffee, thereby causing all the valuable properties to be extracted from the latter, as hereinafter more fully set forth.

In the said drawings, A represents the boiler, the water in which may be heated by means of steam-pipes, gas-jets, or in any other suitable manner, and within this boiler is placed the coffee-receptacle B, composed, preferably, of earthenware, and provided with the usual draft-pipe, $c$, and faucet $d$, another similar faucet, $e$, being provided for drawing hot water from the boiler A, while the usual glass gages, $f\ g$, are secured to the faucets to indicate, respectively, the height of the coffee in the vessel B and that of the water in the boiler A.

To the top of the boiler A is fitted the conical coffee-steeping vessel G, having an enlarged base, $h$, which is provided with a flange, $i$, resting on the upper edge of the boiler, the lower vertical portion, $k$, of the base extending down into an annular sealing-trough, $l$, containing water, which thus prevents the escape of steam at the joint.

The steeping-vessel G is provided with a tight-fitting cover, $m$, to prevent the escape of the aroma of the coffee, and the lower portion, $n$, within which is placed the ground coffee, tapers from $p$, to the smaller vertical portion, $q$, to the bottom of which is secured the strainer $r$, composed of cloth, woven wire, or other suitable material, said strainer being located directly over and preferably fitting within the mouth of the coffee-vessel B, which receives the infusion as it passes through the strainer.

The coffee-steeping vessel G is provided with a series of steam-pipes, H, bent in the form seen in Fig. 2, and extending up on the outside to or nearly to the top of the vessel, and then entering the same and passing down on the inside to or nearly to the bottom, the inlet ends *s* communicating with the upper portion of the boiler A, so as to receive steam therefrom, while the ends *t* are left open, causing the hot steam from the boiler to be discharged either directly into the ground coffee itself or into the water immediately above the same, and in this manner all the heat of the steam is utilized, and the water used to make the infusion is always maintained at or near the boiling-point during the entire time that it is percolating through the ground coffee, whereby every particle of the essential oils, acid, and other valuable properties of the coffee are extracted, thus producing a clear beverage of the highest quality and finest flavor. I prefer to have the outlet ends *t* of the steam-pipes extend down into the ground coffee itself, so as to discharge the hot steam directly into the same, whereby better results are produced; but if preferred the ends *t* may be located just above the level of the ground coffee, the water in either case being maintained at a high temperature during the entire time of its passage through the coffee.

Coffee is often spoiled by carelessly pouring water insufficiently heated into the steeping-vessel, and if this should occur with my apparatus it will be obvious that the water will be at once highly heated by the hot steam introduced directly into it, and that it cannot by any possibility pass through the coffee in a cool or insufficiently heated condition, and, consequently, with my improved apparatus none but the best quality of coffee can be made, even where an unskilled or careless person is employed, a desideratum hitherto unattained in any apparatus with which I am acquainted.

What I claim as my invention, and desire to secure by Letters Patent, is—

1. In a coffee steamer or urn, the combination, with the boiler A and its inclosed coffee-receptacle B, of the coffee-steeping vessel G, placed over the same and provided with a series of steam-pipes, H, communicating with the boiler A, and extending up to or nearly to the top of the steeping-vessel and down within the same to or nearly to the bottom thereof, whereby the steam from the boiler is always discharged below the level of the extracting-liquid in said steeping-vessel, for the purpose of constantly maintaining the same at a high temperature, substantially as set forth.

2. In a coffee steamer or urn, the combination, with the boiler A and its inclosed coffee-receptacle B, of the coffee-steeping vessel G, placed over the same, and having the cover *m*, strainer *r*, and base *h*, the latter fitting within a sealing-trough, *l*, at the upper edge of the boiler, and provided with a series of steam-pipes, H, communicating with the boiler A at *s*, and extending up on the outside to or nearly to the top of the steeping-vessel, and then down within the same to or nearly to the bottom thereof, to discharge the steam below the level of the extracting liquid, all constructed to operate substantially in the manner and for the purpose described.

Witness my hand this 11th day of January, A. D. 1886.

JAMES S. SANBORN.

In presence of—
P. E. TESCHEMACHER,
W. J. CAMBRIDGE.